(12) United States Patent
Tofano

(10) Patent No.: US 8,504,595 B2
(45) Date of Patent: Aug. 6, 2013

(54) DE-DUPLICATION FOR A GLOBAL COHERENT DE-DUPLICATION REPOSITORY

(76) Inventor: Jeffrey Tofano, San Jose, CA (US)

(*) Notice: Subject to any disclaimer, the term of this patent is extended or adjusted under 35 U.S.C. 154(b) by 0 days.

(21) Appl. No.: 13/373,980

(22) Filed: Dec. 7, 2011

(65) Prior Publication Data

US 2013/0151482 A1    Jun. 13, 2013

(51) Int. Cl.
*G06F 17/30* (2006.01)

(52) U.S. Cl.
USPC ........... 707/813; 707/633; 707/642; 707/662; 707/665; 707/667

(58) Field of Classification Search
USPC ............... 707/633, 642, 662, 665, 667, 689, 707/813
See application file for complete search history.

(56) References Cited

U.S. PATENT DOCUMENTS

| | | | |
|---|---|---|---|
| 7,937,419 B2 * | 5/2011 | Ylonen | 707/813 |
| 2004/0024798 A1 * | 2/2004 | Chauvel | 707/206 |
| 2010/0161554 A1 * | 6/2010 | Datuashvili et al. | 707/610 |
| 2010/0306412 A1 * | 12/2010 | Therrien et al. | 709/247 |
| 2010/0332456 A1 * | 12/2010 | Prahlad et al. | 707/664 |
| 2011/0289281 A1 * | 11/2011 | Spackman | 711/154 |
| 2012/0124105 A1 * | 5/2012 | Provenzano | 707/813 |
| 2012/0226699 A1 * | 9/2012 | Lillibridge | 707/747 |

* cited by examiner

*Primary Examiner* — Dennis Truong

(57) ABSTRACT

Example methods and apparatus associated with data de-duplication for a global coherent de-duplication repository are provided. In one example a request related to data de-duplication is transmitted to a plurality of nodes associated with the global coherent de-duplication repository. Responses to the request are received from at least a subset of nodes in the plurality of nodes. Affinity scores are assigned to nodes of the subset of nodes based, at least in part, on affinity data from the responses. A node is selected to perform the request related to de-duplication from the subset of nodes of the plurality of nodes based, at least in part, on the affinity score assigned to the nodes.

7 Claims, 5 Drawing Sheets

DE-DUPLICATION FOR A GLOBAL COHERENT DE-DUPLICATION REPOSITORY

BACKGROUND

De-duplication reduces redundant data by storing a single copy of data, typically to improve storage utilization. De-duplication may involve dividing a larger piece of data into smaller pieces of data. Larger pieces of data may be referred to as "blocks" while the smaller pieces of data may be referred to as "sub-blocks" or "chunks". Dividing blocks into sub-blocks may be referred to as "chunking". De-duplication may be referred to as "dedupe".

In a distributed network, many nodes (e.g., computers, data streams, applications) may be performing data de-duplication for a requesting entity. Conventionally, simple metrics have been used to select a node to perform de-duplication. Node selection may simply be based on which node responds first to a request for de-duplication or geographical proximity. However, the node that responds first to a request might have a wildly different approach to chunking, de-duplication, or determining uniqueness than a node that responds second to the request.

Different chunking approaches may affect the amount of time it takes a node to divide a block into sub-blocks. Additionally, different chunking approaches may lead to more or less data reduction through dedupe. Therefore, a node may be characterized by different chunking approaches that yield varying levels of performance (e.g., time), data reduction (e.g., percent), and balance between performance and data reduction. Thus, some nodes may perform more efficiently than other nodes in the distributed network based on the de-duplication conditions or identity of the requesting entity.

By way of illustration, some nodes perform chunking quickly but inefficiently, resulting in less data reduction, while other nodes perform slowly but more efficiently. For example, a variable sized chunking approach that considers multiple possible boundaries per chunk may take more time to perform but may yield substantial data reduction. In contrast, a fixed size chunking approach that considers only a single fixed size sub-block may take less time to perform but may yield minimal, if any, data reduction. So, there may be a tradeoff between performance time and data reduction. Thus, nodes may perform chunking differently based on chunking factors (e.g., time to perform, data reduction).

Chunking approaches are only one example of how nodes can vary. Once a sub-block has been created, there are different dedupe approaches for determining whether the sub-block is a duplicate sub-block, whether the sub-block can be represented using a delta representation, whether the sub-block is a unique sub-block, and so on. For example, one node may determine whether a sub-block is unique by hashing the sub-block and comparing the hash to hashes associated with previously encountered and/or stored sub-blocks. Different hashes may yield more or less unique determinations due to, for example, a collision rate associated with the hash. Another node may use an alternative approach for determining whether a sub-block is unique that involves sampling the sub-block and making a probabilistic determination based on the sampled data. For example, if none of the sample points match any stored sample points, then the sub-block may be unique, while if a certain percentage of sample points match stored sample points then the sub-block may be a duplicate. Since different hashing and sampling schemes may yield more or less unique determinations, nodes having different hashing and sampling approaches may also have different performance levels and may yield different amounts of data reduction.

Once a block is chunked into sub-blocks and compared to previously stored sub-blocks, it can be determined if a sub-block needs to be stored. Nodes may charge a per sub-block fee for storage or charge fees to access stored blocks. Thus, one node may have more cost effective storage than another node in the distributed network. For example, while a first node may have previously stored many of the sub-blocks to be de-duplicated, if the cost per sub-block storage is disproportionately high, it may be more efficient to have a second node store sub-blocks, even if more sub-blocks need to be stored.

While a node's response time to a request and geographical proximity may be relevant to selecting a node, a more sophisticated choice can be made based on one or more affinity factors (e.g., chunking approach, data de-duplication approach, uniqueness determination, total cost).

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
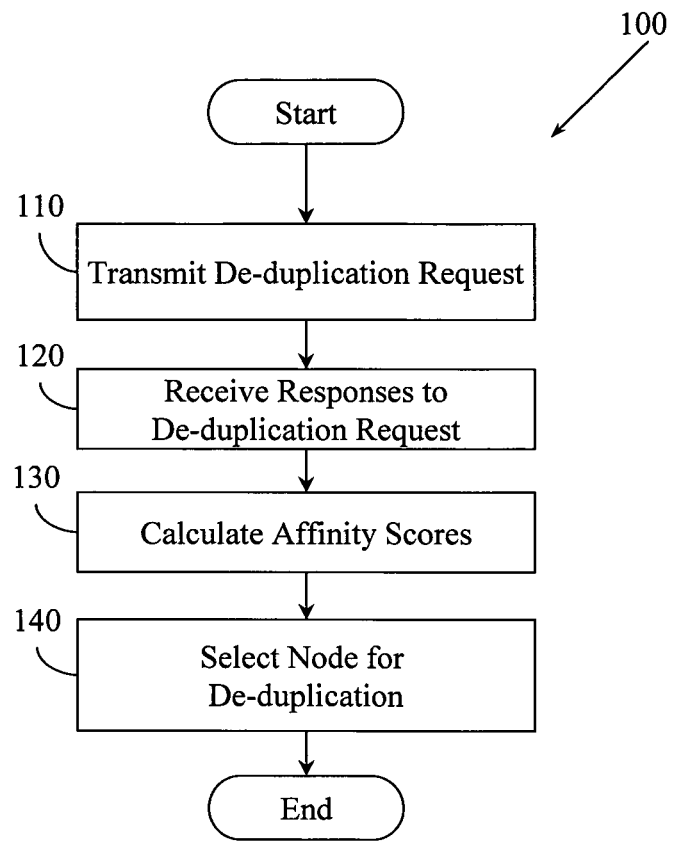
FIG. 1 illustrates a method associated with de-duplication for a global coherent de-duplication repository.

Example apparatus and methods perform de-duplication using nodes associated with a global coherent de-duplication repository for a requesting entity (e.g., application, computer, actor). Nodes associated with a global coherent de-duplication repository have information regarding their abilities with respect to affinity factors including, but not limited to, nodal characteristics (e.g., chunking approach, hashing approach, de-duplication approach), information regarding a node's identity with respect to other nodes (e.g., membership in a group), and information regarding a node's relationship with the requesting entity (e.g., amount of bridging, geographical proximity). A plurality of nodes located within the global coherent de-duplication repository may be capable of data de-duplication. Example apparatus and methods select at least one node of the plurality of nodes to perform an activity related to de-duplication based, at least in part, on an affinity score calculated from the affinity factors.

A global coherent de-duplication repository may include many nodes. Nodes may work on different types of data or at different locations. The global coherent de-duplication repository may include nodes that have different processing power and different communication capacity. Nodes may have different approaches to de-duplication. Nodes may also have different costs associated with de-duplication. For example, a node may charge a predetermined amount to store sub-blocks that have not been previously stored. The predetermined amount may be based on one or more considerations (e.g., the type of sub-block, the number of sub-blocks to be stored, geographic location, the de-duplication approach of the node).

Nodes may be arranged in groups within the global coherent de-duplication repository. Groups may be defined by a common type of data held by nodes within the group. For example, a group of nodes may be associated with a type of work product (e.g., documents, spreadsheets, emails, presentations, figures) or data generated in a particular location (e.g., Cleveland, Toronto, Tokyo). Alternatively, a group of nodes may be associated with the type of work conducted (e.g., financial reports, marketing, human resources). One group may have a different approach to de-duplication than another group. For example, one group may use a rolling hash that identifies sub-block boundaries in variable length chunking. One group may use another approach, chunking may be performed by taking fixed size sub-blocks. One group may employ a hybrid approach consisting of a combination of rolling hash variable length chunking and fixed sized chunking.

Thus, there are many factors that affect the manner in which a node deduplicates blocks of data. Affinity factors allow a requesting entity to determine which node in the global coherent de-duplication repository is well-suited to interact with the requesting entity. For example, the requesting entity may perform variable size chunking that would interfere with a node performing fixed size chunking. To work together, a certain amount of bridging, which can be time intensive and costly, will need to be performed to avoid interference. Thus, determining a node's affinity for a requesting entity allows a requesting entity to make an informed selection. For example, a requesting entity can assess a node's ability to work with a requesting entity. One of ordinary skill in the art will recognize that selecting a node using a more sophisticated metric would be desirable.

Example apparatus and methods select at least one node to perform de-duplication based on affinity scores calculated for the nodes. An affinity score provides a way to compare nodes. The affinity score of a node is based, at least in part, on the affinity factors of the node. For example, the affinity score may be based on one or more of the number of shared blocks a node has stored, a cost of data de-duplication as performed by the node, geographical proximity of the node, amount of bridging required to interact with the node, and how the node performs data de-duplication.

An affinity score can be calculated to facilitate selection of a node or group that is appropriate for de-duplication of a block of data. Different tradeoffs between performance, data reduction, and cost may also be identified for different approaches. An affinity score may be based on a combination of affinity factors. For example, an affinity score may be based on total cost which involves how many common sub-blocks the node has stored and the cost of storing of sub-blocks.

Example apparatus and methods may facilitate selecting a node based on chunking, hashing, sampling, and/or uniqueness determination approaches that achieve desired results for different types of data or different conditions. Example apparatus and methods may select a node based, at least in part, on the node's relationship with other nodes in the global coherent de-duplication repository. As affinity scores are calculated, example apparatus and methods may continue to automatically select a node or group to perform dedupe. Alternatively, example systems may calculate affinity scores before some or all attempts to deduplicate data.

In one example, a first node may be configured to chunk, sample, and/or compare sub-blocks in a first way. A second node may be configured to chunk, sample, and/or compare sub-blocks in a second way. The first node and the second node may receive affinity scores. The affinity scores may be calculated based on a desired balance between performance and data reduction. The affinity scores may also be calculated based on the specifications of the requesting entity. Based on the affinity scores, the first node or the second node is selected to perform data de-duplication. Alternatively, the first node may be selected to perform the portion of de-duplication for which it is best suited, and the second node may be selected to perform the remainder of the de-duplication. Thus, one skilled in the art will appreciate that N different nodes (N being an integer) may be evaluated, one or more of these nodes may be selected, and either all or a subset of the nodes may be controlled to perform de-duplication.

Dedupe may be performed for different requesting entities. In one example, apparatus and methods are configured to arrange nodes in groups. For example, a requesting entity may work with data regarding personnel that is congruent with the human resources data. Nodes in a human resources group may be best equipped to achieve a desired balance of performance and data reduction even if other affinity factors are not in the node's favor. Accordingly, nodes in the human resources group may receive an enhanced affinity score when interacting with a requesting entity that works with personnel data. Arranging the nodes in groups may streamline the process of selecting of a node.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 associated with de-duplication for a global coherent de-duplication repository. Method 100 includes, at 110, transmitting a request for de-duplication, or an activity related to de-duplication, to a plurality of nodes in the global coherent de-duplication repository, and, at 120, receiving responses to the request from at least a subset of the plurality of nodes in the global coherent de-duplication repository. At 130, affinity scores are calculated for nodes in the responding subset of the plurality of nodes based, at least in part, on a node's respective response.

In one example, the responses of the responding subset of nodes contain affinity data about the responding subset of nodes. The affinity data may include, but is not limited to including, information regarding the manner in which de-duplication is performed, the relationship between the requesting entity and a node, and the relationship between the nodes. An affinity score is calculated based, at least in part, on affinity data received in a node's response.

At 140, a node is selected for de-duplication. The selection is based on the affinity scores assigned to the responding subset of nodes at 130. A node may be chosen because the affinity score reflects that the node is aligned with the goals of the requesting entity based on a plurality of affinity factors. Alternatively, a node may be selected because the affinity score reflects that the node has a specific affinity factor that makes it well-suited to perform the data de-duplication. Method 100 may also include, at 140, selecting additional nodes for de-duplication.

While FIG. 1 illustrates various actions occurring in serial, it is to be appreciated that various actions illustrated in FIG. 1 may occur substantially in parallel. By way of illustration, a first process may receive responses from a subset of nodes of the plurality of nodes in the global coherent de-duplication repository. A second process may calculate affinity scores for the plurality of nodes in the global coherent de-duplication repository, regardless of whether the nodes respond, using affinity data a requesting entity previously received. A third process may compare the affinity scores for the responding subset of nodes as the responses are received. While three processes are described, it is to be appreciated that a greater and/or lesser number of processes may be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform a method that includes calculating an affinity score for a node based on the affinity factors. The method may also include selecting a node for performing de-duplication or a de-duplication related activity based on the affinity score assigned to the node.

While executable instructions associated with the above method are described as being stored on a computer-readable medium, it is to be appreciated that executable instructions associated with other example methods described herein may also be stored on a computer-readable medium.

Figure 2:
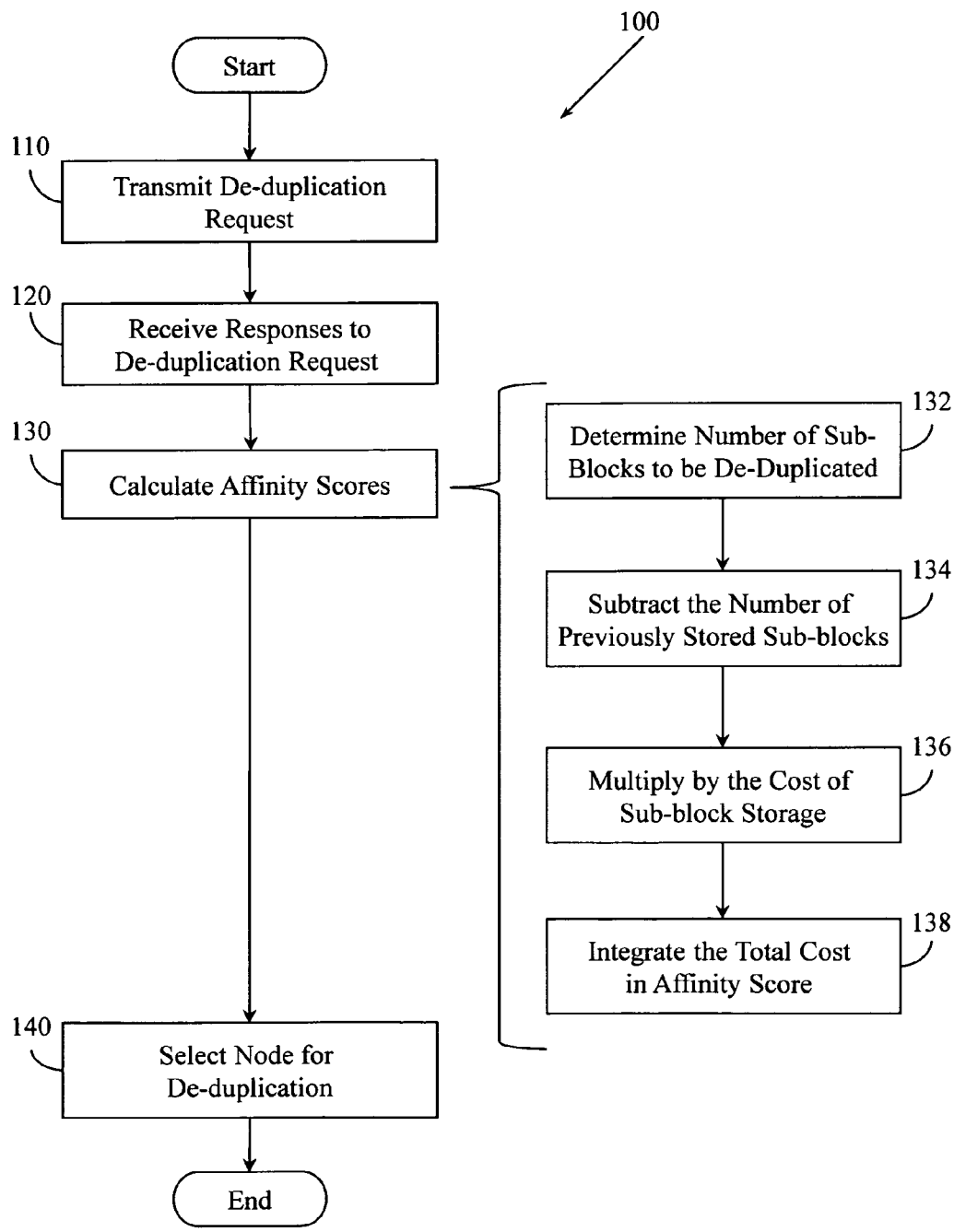
FIG. 2 illustrates an example method associated with de-duplication for a global coherent de-duplication repository.

FIG. 2 illustrates one embodiment of method 100. In this embodiment, calculating an affinity score at 130 can include several actions. The actions may include, but are not limited to, calculating the number of sub-blocks that a node has not stored yet. At 132, the number of sub-blocks that are to be deduplicated is determined. The number of unstored sub-blocks is calculated by subtracting, at 134, the number of sub-blocks to be deduplicated by a number of previously stored sub-blocks. Previously stored sub-blocks are sub-blocks to be deduplicated that the node already has in storage or has previously encountered. Therefore, the unstored sub-blocks may be stored in the global coherent de-duplication repository. At 136, the number of unstored sub-blocks is multiplied by the cost of storage per block. Thus, the total cost for storing sub-blocks using a particular node can be calculated.

The total cost of de-duplication combines affinity factors to determine if the characteristics of a node are aligned with the goals of the requesting entity. As described above, the total cost of de-duplication includes determining the number of unstored sub-blocks. A requesting entity may receive information related the number of previously stored sub-blocks or the number of unstored sub-blocks in the response to the request for de-duplication. The response may also include information regarding the cost of sub-block storage. As described herein, the cost of sub-block storage may be given on a per sub-block basis, but one of ordinary skill in the art will understand that the cost of sub-block storage may be calculated a number of different ways (e.g., wholesale, flat rate, in bulk, a first number of blocks may be de-duplicated at a first rate and a second number of blocks may be de-duplicated a second rate).

The method 100 may also include, at 138, integrating the total cost of de-duplication into the affinity score. The total cost of de-duplication may be the main concern of a requesting entity. Accordingly, the affinity score may be wholly based on the total cost of de-duplication. Alternatively, other affinity factors may affect the calculation of the affinity score as well, and thus, also be integrated in the affinity score calculation. FIG. 2 illustrates an example method that includes the total cost of de-duplication into the affinity score.

Figure 3:
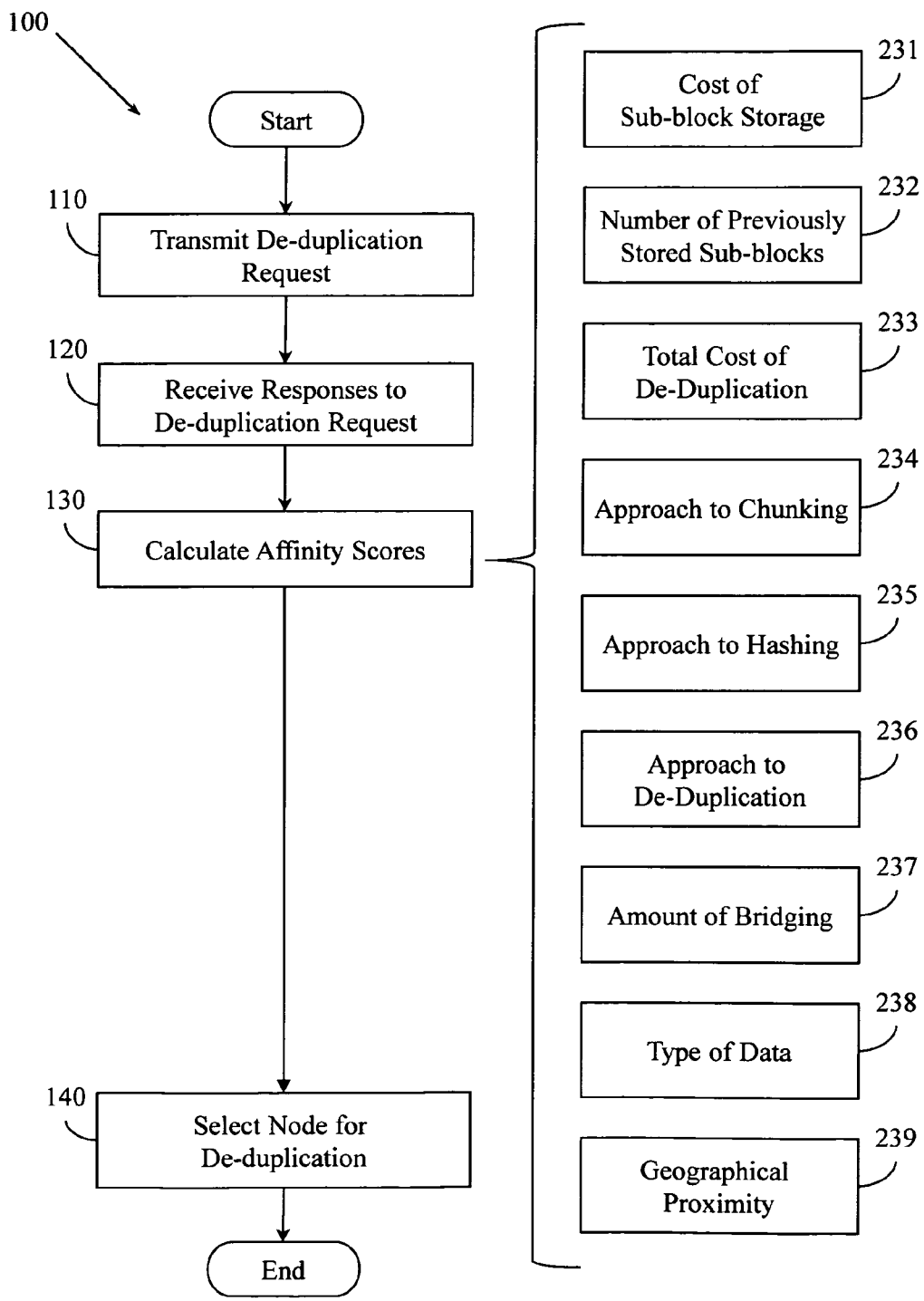
FIG. 3 illustrates additional detail for a method associated with de-duplication for a global coherent de-duplication repository.

FIG. 3 illustrates additional detail for one embodiment of method 100. In this embodiment, calculating an affinity score at 130 may include one or more of a plurality of affinity factors. The affinity factors may include, but are not limited to, cost of sub-block storage at 231, number of previously stored sub-blocks at 232, the total cost of de-duplication at 233, an approach to chunking at 234, an approach to hashing at 235, an approach to de-duplication at 236, an amount of bridging necessary to perform de-duplication at 237, type of data to be de-duplicated at 238, and geographical proximity at 239. One of ordinary skill in the art will understand that these are example affinity factors and other affinity factors may also be included.

Cost of sub-block storage at 231, number of previously stored sub-blocks at 232, and the total cost of de-duplication at 233 are described herein with respect to FIG. 2. How a node performs de-duplication may have a significant effect on whether a node is appropriate for the requested de-duplication. A node's approach to chunking, illustrated at 234, approach to hashing, illustrated at 235, and approach to de-duplication, illustrated at 236, affect the performance and data reduction of a node. Accordingly, a node employing certain approaches may receive a higher score than a node not using those approaches.

A requesting entity may be configured to interact with a node using a particular approach to chunking, hashing, or de-duplication. Accordingly, bridging (e.g., adaptation) may be required to allow the requesting entity to interact with the node. Bridging can become time intensive and costly. Thus, the amount of bridging required to interact with a node, illustrated at 237, is an affinity factor. A node having a similar type of data, illustrated at 238, may also facilitate interaction between a requesting entity and a node. Geographical proximity, illustrated at 239, is also an affinity factor.

FIG. 3 illustrates a number of affinity factors that may or may not be used in calculating an affinity score for a node. While only one affinity factor (e.g., total cost of de-duplication) may be used, it is likely that a number of affinity factors are used in conjunction with one another. Accordingly, the affinity score calculation may incorporate a plurality of affinity factors.

The affinity factors may not be considered equally in the affinity score calculation. In a weighted affinity score calculation, instead of the affinity factors contributing equally to the affinity score, one or more of the affinity factors may contribute to the affinity score more than others. For example, the cost of sub-block storage may affect the affinity score twice as much as the remaining affinity factors. Alternatively, a plurality of affinity factors may be weighted. For example, a requesting entity may weight a hashing approach as twice the weight of other affinity factors, a chunking approach as three times the weight of the other affinity factors, and the de-duplication approach as four times the weight of the other affinity factors. Rather than giving an affinity factor extra weight, a weighted affinity score calculation may lighten the weight of an affinity factor. For example, geographical proximity may be given half the weight of other affinity factors. Thus, multiple affinity factors may be weighted and they may be weighted differently than one another.

In one example, affinity factors may only be considered in the affinity score calculation if the affinity data falls within an acceptable range. For example, a requesting entity may identify three approaches to hashing. If the node's affinity data does not identify one of the three identified hashing approaches, the approach to hashing may not be included in the affinity score calculation. Alternatively, the response may lower the affinity score of the node or disqualify the node.

A mathematical approach to the affinity score calculation may be based on the number of nodes in the global coherent de-duplication repository, the plasticity of a node (e.g., the node's ability to adapt), and environmental considerations (e.g., streaming capacity). One of ordinary skill in the art will appreciate that other mathematical approaches (e.g., algorithms) may be employed in the affinity score calculation.

Figure 4:
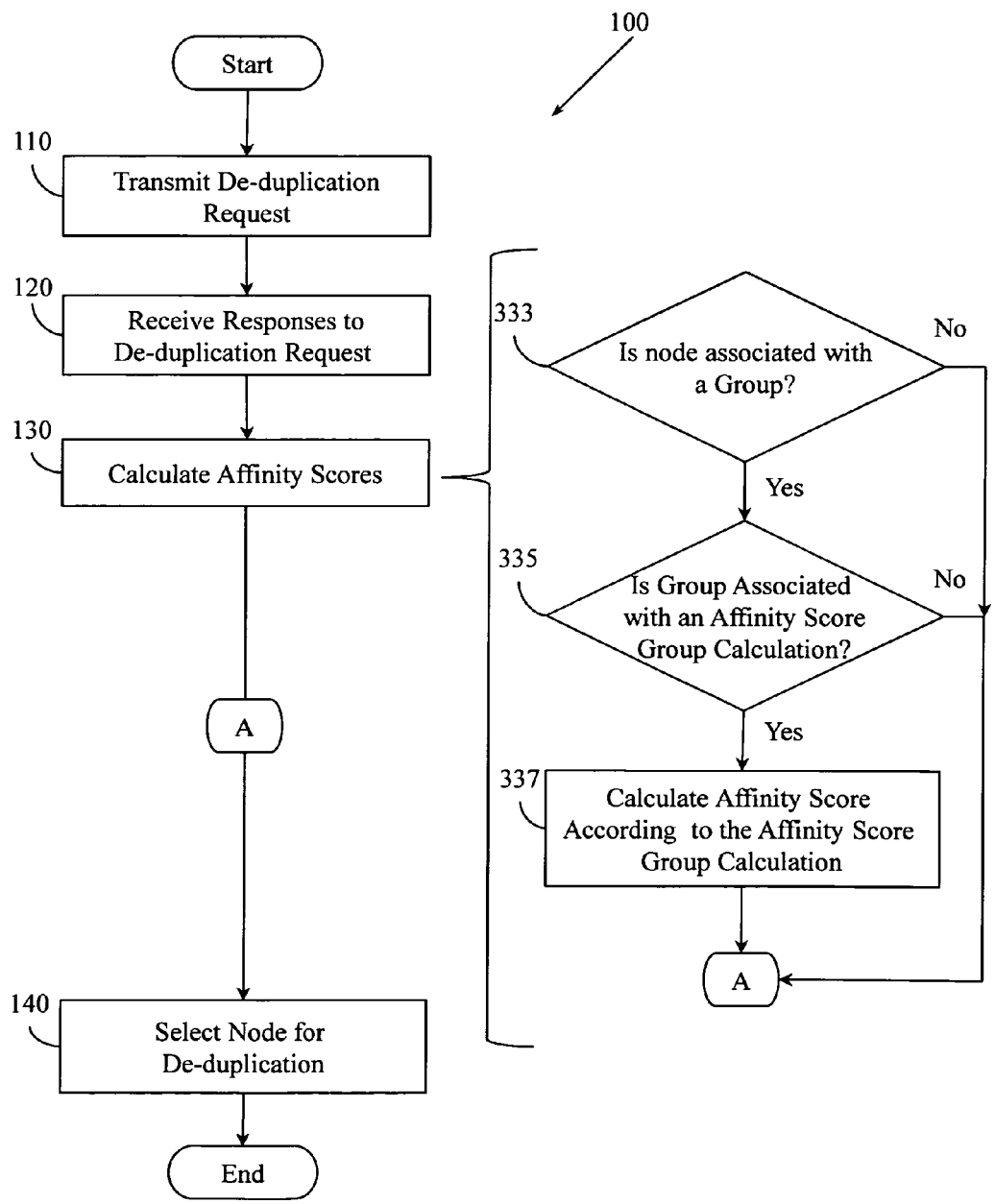
FIG. 4 illustrates an example method associated with de-duplication for a global coherent de-duplication repository.

FIG. 4 illustrates additional detail for one embodiment of method 100. In this embodiment, calculating an affinity score at 130 can include several actions. The actions can include, but are not limited to, determining how a grouping of nodes in the global coherent de-duplication repository affects the calculation of an affinity score.

At 333, it is determined if the node belongs to a group. Groups may be defined by the relationship between the nodes (e.g., nodes in close geographical proximity, nodes that typically work with one another, nodes that work with similar data types) in the global coherent de-duplication repository. Alternatively, a node may be grouped because it does not belong to any other group. Nodes may also be grouped by their relationship with the requesting entity. Information regarding a node's group may be included in the response to the request for de-duplication.

If it is determined that a node does belong to a group, at 335, it is determined whether the group that the node belongs to has an effect on the affinity score. The group the node belongs to may affect the mathematical approach for calculating an affinity score for that node. For example, the affinity score for a particular group may be calculated according to a specific weighted calculation. The mathematical approach may use one or more affinity factors and the affinity factors may be weighted.

At 337, the affinity score is calculated for a node based on the mathematical approach to the affinity score calculation identified at 335. The calculation at 337 may result in a calculation of the affinity score at 130. Alternatively, the calculation at 337 may be a portion of the calculation of the affinity score at 130. If the node does not belong to a group or if the group is not associated with a mathematical approach to calculating the affinity score, the method 100 returns to 130 to calculate the affinity score. The calculation of the affinity score at 130 may be a default affinity score calculation. Thus, the affinity score can take into account the grouping of nodes in the plurality of nodes and the grouping may change the mathematical approach to the calculation of the affinity score.

Figure 5:
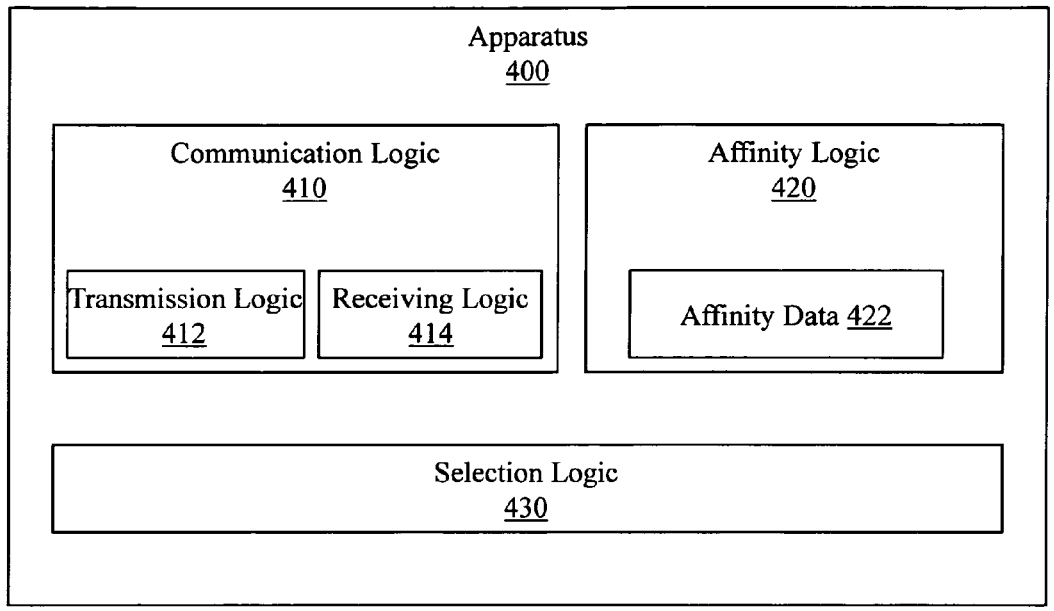
FIG. 5 illustrates an apparatus associated with de-duplication for a global coherent de-duplication repository.

FIG. 5 illustrates an apparatus 400 associated with de-duplication for a global coherent de-duplication repository. Apparatus 400 includes a communication logic 410, an affinity logic 420, and a selection logic 430. Apparatus 400 may also include a processor, a memory, and an interface configured to connect the processor, the memory, and the logics.

The communication logic 410 may be configured to communicate with nodes in the global coherent de-duplication repository. The communication logic 410 is configured with a transmission logic 412 and a receiving logic 414. The transmission logic 412 is configured to transmit requests for de-duplication, or an activity related to de-duplication, to a plurality of nodes associated with a global coherent de-duplication repository. The receiving logic 414 is configured to receive responses from at least a subset of the plurality of nodes in the global coherent de-duplication repository.

The affinity logic 420 may be configured to calculate an affinity score. The affinity score may be based on affinity data 422. In one example, the affinity logic 420 is configured to acquire the affinity data 422 on a per node basis. The affinity logic 420 may acquire affinity data 422 about the nodes in the responses to the requests related to de-duplication. Affinity data 422 may include, but is not limited to including, data regarding the affinity factors. For example, the affinity data 422 may include the cost of sub-block storage, the number of previously stored sub-blocks, the total cost of de-duplication, an approach to chunking, an approach to hashing, an approach to de-duplication, amount of bridging necessary to perform de-duplication, type of data to be de-duplicated, and geographical proximity data.

The selection logic 430 may be configured to select a node to perform de-duplication, or an activity related to de-duplication, based, at least in part, on the affinity data 422. The selection logic 430 may be configured to select a node with the optimum affinity score. Alternatively, the selection logic 430 may be configured with a range of affinity scores, where the selection logic 430 selects a node having an affinity score in the range of affinity scores. The selection logic 430 may select more than one node to perform de-duplication or the activity related to de-duplication.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

While example apparatus, methods, and computer-readable media have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a data de-duplication apparatus control the data de-duplication apparatus to perform a method, the method comprising:
    transmitting a request associated with de-duplication to a plurality of nodes associated with a global coherent de-duplication repository, where the plurality of nodes are arranged in groups associated with the global coherent de-duplication repository;
    receiving responses to the request from at least a subset of nodes of the plurality of nodes associated with the global coherent de-duplication repository;
    calculating affinity scores for nodes of the subset of nodes based, at least in part, on affinity factors received in the responses from the nodes, where calculating an affinity score employs a group calculation that is used when a node belongs to a group;
    calculating a total cost of de-duplication for a node by determining a number of unstored blocks by subtracting sub-blocks to be deduplicated by a number of previously stored blocks, and multiplying the number of unstored blocks by a cost per sub-block storage;
    including the total cost of de-duplication for the node in the affinity score for the node; and
    selecting a node from the subset of the plurality of nodes to perform the request based, at least in part, on the affinity scores calculated for the nodes.

2. The computer-readable medium of claim 1, where an affinity score is based, at least in part, on a plurality of affinity factors, and where the affinity factors are weighted.

3. The computer-readable medium of claim 2, where a first affinity factor is weighted with a first weight and a second affinity factor is weighted with a second weight, and where the first weight is different than the second weight.

4. The computer-readable medium of claim 1, where a first node is selected to perform a first portion of the request and a second node is selected to perform a second portion of the request.

5. A data de-duplication apparatus, comprising:
    a processor;
    a memory;
    a set of logics;
    an interface configured to connect the processor, the memory, and the set of logics,
    the set of logics comprising:
        a communication logic configured to communicate a de-duplication request to a plurality of nodes associated with a global coherent de-duplication repository;
        an affinity logic configured to calculate affinity scores for nodes in the plurality of nodes based, at least in part, on affinity data, where the affinity data includes affinity factors received from one or more of the plurality of nodes;
        a selection logic configured to select at least one node to perform de-duplication;
        a grouping logic configured to arrange the plurality of nodes in groups, where the affinity score for a node is affected by a group the node belongs to, by communicating with the grouping logic; and
        where the affinity logic is configured to calculate a total cost of de-duplication for a node by determining a number of unstored blocks by subtracting sub-blocks to be deduplicated by a number of previously stored blocks, and multiplying the number of unstored blocks by a cost per sub-block storage, where the total cost of de-duplication for the node is included in the affinity score for the one or more nodes.

6. The apparatus of claim 5, where affinity data is based, at least in part, on a plurality of affinity factors, where the affinity factors are weighted.

7. A method, comprising:

transmitting a request associated with de-duplication to a plurality of nodes associated with a global coherent de-duplication repository;

receiving responses to the request from at least a subset of nodes of the plurality of nodes associated with the global coherent de-duplication repository;

identifying at least one node of the subset of nodes that belongs to a group;

determining if the group associates the at least one node with an affinity score group calculation;

calculating affinity scores for nodes of the subset of nodes based, at least in part, on at least one affinity factor received in the responses from the nodes, where the at least one node's affinity score is based, at least in part, on the affinity score group calculation;

calculating a total cost of de-duplication for a node by determining a number of unstored blocks by subtracting sub-blocks to be deduplicated by a number of previously stored blocks, and multiplying the number of unstored blocks by a cost per sub-block storage;

including the total cost of de-duplication for the node in the affinity score for the node; and selecting a node from the subset of the plurality of nodes to perform the request based, at least in part, on the affinity scores calculated for the nodes.

* * * * *

UNITED STATES PATENT AND TRADEMARK OFFICE
CERTIFICATE OF CORRECTION

| | |
|---|---|
| PATENT NO. | : 8,504,595 B2 |
| APPLICATION NO. | : 13/373980 |
| DATED | : August 6, 2013 |
| INVENTOR(S) | : Jeffrey Tofano |

It is certified that error appears in the above-identified patent and that said Letters Patent is hereby corrected as shown below:

In the Specification

Detailed Description of Invention:

In column 6, line 16, delete "related the" and insert --related to the--.

Signed and Sealed this
Twenty-second Day of October, 2013

Teresa Stanek Rea
*Deputy Director of the United States Patent and Trademark Office*